United States Patent [19]
Haytayan

[11] Patent Number: 5,890,273
[45] Date of Patent: Apr. 6, 1999

[54] METHOD FOR DETACHING PLASTIC COMPONENTS FROM AUTOMOBILES AND OTHER PRODUCTS

[76] Inventor: Harry M. Haytayan, 32 Indian Rock Rd., Nashua, N.H. 03063

[21] Appl. No.: 878,278

[22] Filed: Jun. 18, 1997

[51] Int. Cl.$^6$ .................................................. B23P 19/02
[52] U.S. Cl. .......................... 29/426.4; 29/403.3; 29/254; 225/1
[58] Field of Search ................ 29/403.3, 426.4, 29/254, 255, 243.53, 252, 275, 277; 225/1, 93; 81/463

[56] References Cited

U.S. PATENT DOCUMENTS

| | | | |
|---|---|---|---|
| 2,213,435 | 9/1940 | Temple, Jr. | 29/254 |
| 3,210,832 | 10/1965 | Kalen | 81/463 |
| 3,222,766 | 12/1965 | Camargo | 29/275 |
| 3,576,064 | 4/1971 | Brackin | 29/254 |
| 3,620,635 | 11/1971 | DalBianco | 29/426.4 |
| 3,812,573 | 5/1974 | Fukuroi | 29/426.4 |
| 4,365,401 | 12/1982 | Ogren | 29/243.53 |
| 5,237,613 | 8/1993 | Berry et al. | 29/254 |

OTHER PUBLICATIONS

United States Statutory Registration No. H419, Halver V. Ross, Feb. 2, 1988.

*Primary Examiner*—David P. Bryant
*Attorney, Agent, or Firm*—Pandiscio & Pandiscio

[57] ABSTRACT

An improved method and apparatus for effecting separation of plastic components from associated metal components where the plastic and metal components are attached to one another by fasteners, e.g., effecting separation of plastic components from a discarded manufactured product such as an automotive vehicle. The improved method comprises impacting the heads of the fasteners in a direction leading from the plastic component to the metal component, so as to cause the plastic component to rupture around the fasteners and thereby free the plastic component from the metal component. The improved apparatus is a pneumatically-powered striker device that is designed for easy alignment of its striker with the heads of the fasteners and is capable of driving its striker against said fasteners with sufficient force and acceleration to cause rupture of the plastic component around the fasteners so as to free the plastic component from the metal component.

6 Claims, 3 Drawing Sheets

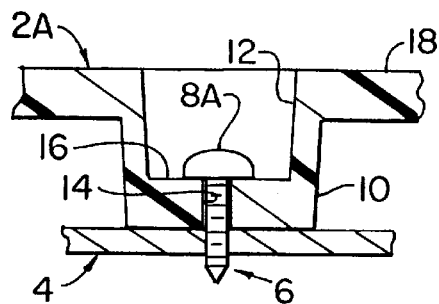
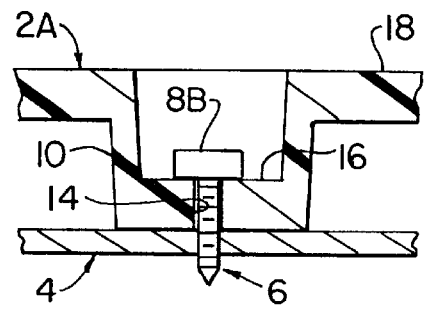
FIG. 1          FIG. 2
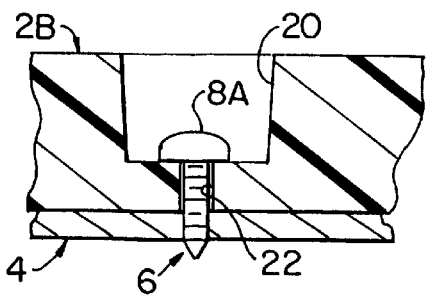
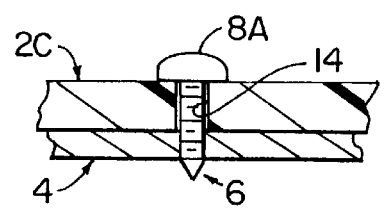
FIG. 3          FIG. 4
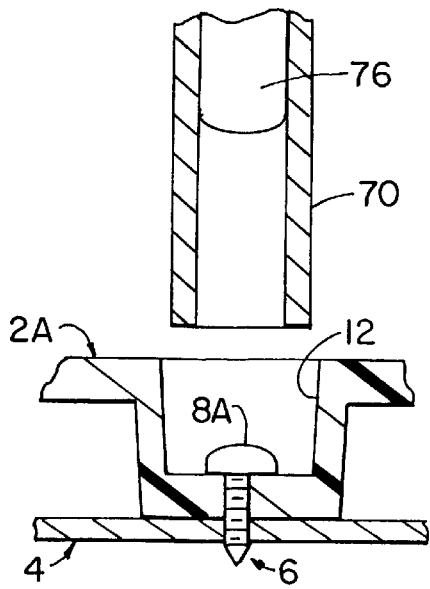
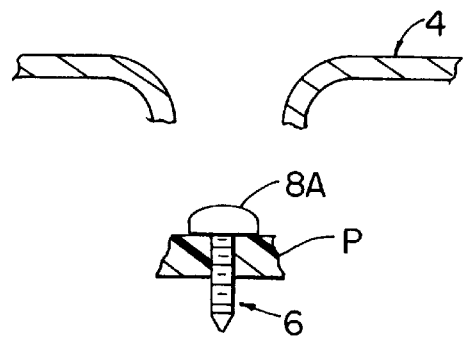
FIG. 7          FIG. 8

METHOD FOR DETACHING PLASTIC COMPONENTS FROM AUTOMOBILES AND OTHER PRODUCTS

This invention relates to the task of separating metal and plastic components of a product that is to be disposed of for various reasons, e.g., because of being obsolete or damaged, and more particularly to a method and apparatus for separating plastic components from associated metal components of a discarded manufactured product such as an automotive vehicle.

BACKGROUND OF THE INVENTION

Various governmental laws and regulations relating to the environment and disposal of materials require that certain manufactured products (e.g., vehicles and household appliances) destined for disposal or recycling of materials must first have their plastic components separated from their metal components, particularly where the metal components are to be remelted. Accordingly, it is essential that companies involved in disposal of products that comprise both plastic and metal components, e.g., automotive vehicle manufacturers or junk dealers specializing in disposal of automotive vehicles, be able to effect separation of plastic components from metal components in an efficient manner. In the case of disposal of automotive vehicles, such plastic items such as door panels, dashboards, ceiling liners, and wall and floor panels need to be detached from metal components such as body frames and panels, doors, and trunk and hatchback lids. In most cases, such plastic components are attached to metal components by screw-type fasteners. Most commonly the fasteners have Phillips-type or socket-type heads to facilitate screwing and unscrewing. However, screw fasteners with heads of some other geometric configuration may also have been used. Regardless of the type of fastener head, heretofore removal of such fasteners has involved use of power-driven screw drivers (as used herein, power-driven screw drivers includes those that are shaped as sockets to fit over and lock to multi-sided heads or are shaped for insertion into multi-sided sockets in the fastener heads).

However, using a screw-driver tool to detach plastic components from other metal or plastic components is unsatisfactory for dismantling vehicles, since that procedure is too slow and costly, particularly in view of the fact that the number of vehicles being scrapped each year numbers in the hundreds of thousands in some countries and in the millions in more populated industrial countries, e.g., the U.S.A. France, Germany, Italy and Japan. In this connection it should be noted that the unscrewing operation requires first that the tip of the unscrewing tool be properly engaged with the fastener head. Secondly, once the tip of the unscrewing tool is engaged with the fastener, additional time is required to unscrew and remove the fastener. From a cost standpoint the time factor becomes critical in the case where the location of the fastener makes it difficult to properly engage the head of the fastener with the tip of the unscrewing tool. The fastener accessing problem is rendered even more difficult in the case where the head of the fastener is in a recessed portion of the surrounding plastic component. In this connection it should be noted that forming a plastic component with one or more recesses sized to receive the head of a fastener is common practice where it is desired that the head of the fastener not detract from the aesthetics of the product or at least that it not be in a position where it may be engaged by and irritate the user or otherwise interfere with use or the lifetime of the plastic component. The typical automobile of today has numerous plastic components with recessed sections for accommodating the heads of fasteners used to attach those components to other components (metal or plastic).

OBJECTS AND SUMMARY OF THE INVENTION

Since initially the present invention was conceived for the express purpose of facilitating removal of plastic components from automotive vehicles that are to be scrapped, the invention is described hereinafter in connection with automotive vehicles. However, it is recognized that other forms of vehicles present similar dismantling problems and that the invention may be applied to such other vehicles as well as to household or business products, e.g., household appliances such as refrigerators, freezers, dishwashers, washing machines, clothes dryers, etc., that comprise metal and plastic parts. Therefore, as used herein, the term "automotive vehicle" is intended to include automobiles, trucks, busses and other kinds of land vehicles having plastic components that are attached by means of individual fasteners, the term "vehicle" is to be construed as including various forms and types of vehicles, including but not limited to land vehicles, aircraft, and ships or boats, and the term "appliance" is used in a general sense to denote and include various forms of appliances for household of business use.

One primary object of the invention is to provide a new method for separating plastic components from associated metal components where the plastic and metal components are connected by fasteners.

Another primary object of the invention is to provide an improved apparatus for effecting separation of plastic components from associated metal components where the plastic and metal components are connected by fasteners.

Another object is to provide an improved method for detaching plastic components from vehicles and appliances.

A further object is to provide an improved tool for detaching plastic components from vehicles and appliances.

Still another object is to provide an improved method for separating plastic components from associated metal components where the plastic and metal components are attached to one another by fasteners, said improved method comprising impacting the heads of the fasteners in a direction leading from the plastic component to the metal component, so as to cause the plastic component to rupture around the fasteners and thereby free the plastic component from the metal component.

Still a further object is to provide an improved apparatus for effecting separation of plastic components from associated metal components where the plastic and metal components are attached to one another by fasteners, said improved apparatus being adapted to impact the heads of the fasteners in a direction leading from the plastic component to the metal component, so as to cause the plastic component to rupture around the fasteners and thereby free the plastic component from the metal component.

The foregoing and other objects are achieved by providing an impacting driver that comprises (1) a nozzle portion that is adapted to fit over the head of a fastener connecting a plastic component to a metal component, (2) a striker portion disposed within the nozzle portion for relative reciprocal motion, and (3) means for propelling the striker through a work stroke whereby the tip of the striker impacts the head of the fastener with a force sufficient to rupture the plastic component close around the fastener, so that the bulk of the plastic component is detached from the fastener and the metal component. The method of the invention involves positioning the nozzle of the drive over the head of a fastener, and then firing the driver so as to cause the striker to impact the fastener and thereby effect detachment of the plastic component from the metal component. In the case where the fastener head resides in a recess in the plastic component, the nozzle portion is sized so that it can be inserted into the recess far enough for its striker to impact the fastener with sufficient force to cause rupturing of the plastic component around the head of the fastener. In a general sense, the mode of operation of the method and apparatus may be described as a "punching out" action.

Other features and advantages of the invention are described or rendered obvious from the following detailed description of the invention which is to be considered together with the accompanying drawings.

THE DRAWINGS

FIG. 1 is a fragmentary sectional view illustrating a plastic component attached to a metal component by a fastener, with the plastic component being formed with a hollow boss or standoff that engages the metal component and defines a recess to accommodate the head of the fastener;

FIG. 2 is a view like FIG. 1 but illustrating a fastener with a different shaped head;

FIG. 3 is a fragmentary sectional view like FIG. 1 but differs in that the plastic component does not have a boss but has a recess for the head of the fastener;

FIG. 4 is a fragmentary sectional view illustrating a third way that plastic components are attached to a metal component by fasteners;

FIGS. 7 and 8 illustrate how the tool of FIG. 4 is used to detach plastic components that are secured to supporting components by individual fasteners.

In the several figures like numerals are used to identify like components.

SPECIFIC DESCRIPTION OF ILLUSTRATED EMBODIMENTS

Figure 5:
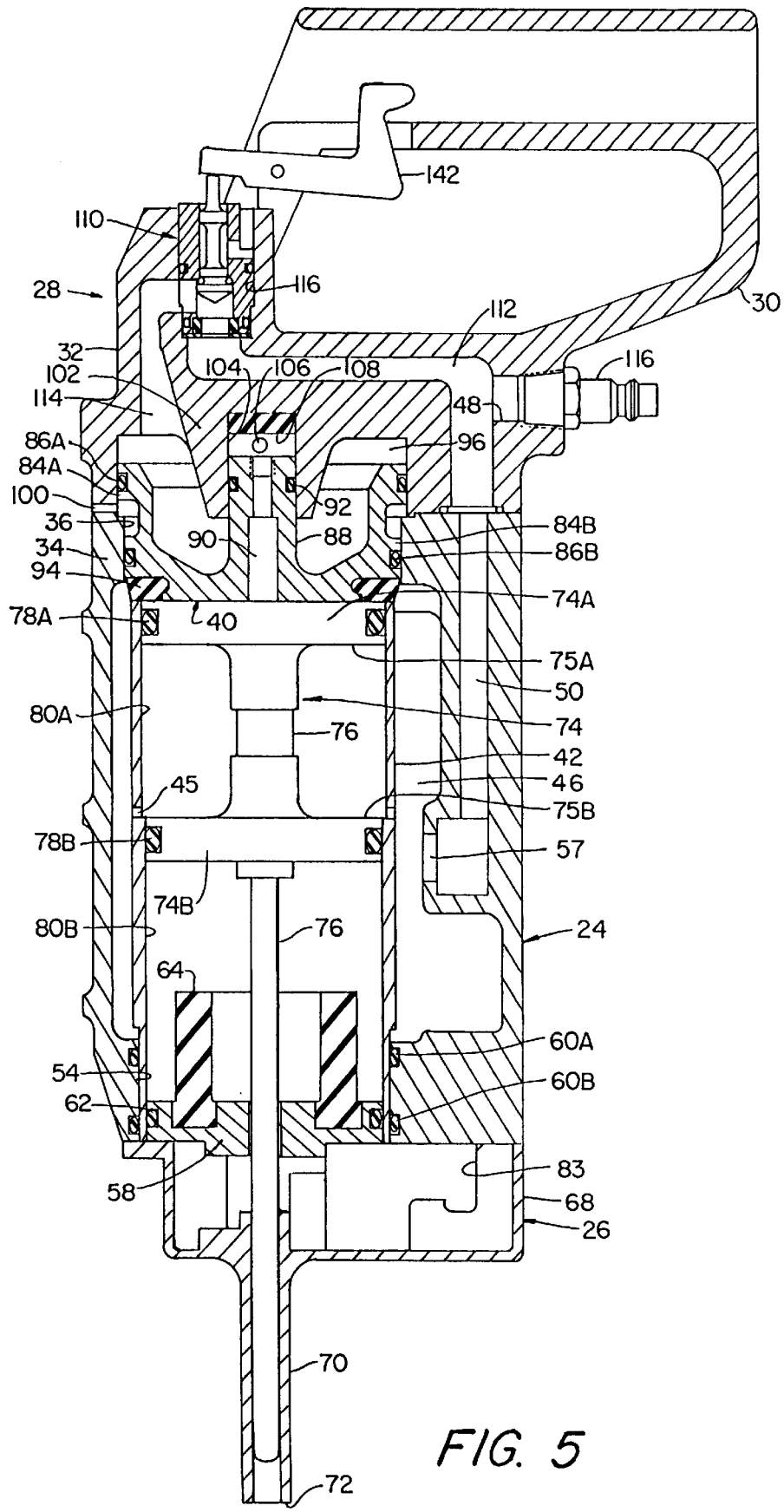
FIG. 5 is a sectional view in elevation of an impacting driver provided according to the invention for the purpose of detaching plastic components like those shown in FIGS. 1–4, with the driver's striker in a retracted or ready position.

FIGS. 1 and 2 shows one configuration common to automotive vehicles for attaching plastic components to other components, e.g., a plastic panel to a metal frame or support such as a door body or dashboard frame, by screw fasteners. In this case a plastic member 2A is attached to a supporting metal component 4 by a screw fastener 6. The latter may have a Philips-type head 8A with a convex top surface as shown in FIG. 1 or a Philips or socket type head 8B with a flat top surface as shown in FIG. 2. Screw fastener 6 may be a self-tapping sheet metal screw in the case where the metal component does not have a threaded (tapped) hole, or it may be threaded in the case where the metal support 4 has a threaded hole for the screw. It should be noted that commonly the metal component is relatively thin, e.g., $1/32$"–$1/16$" thick. The plastic component 2A is formed with a depressed section in the form of a hollow standoff or boss 10, with the bottom (outer) end of the boss engaging the metal component 4 and the opposite (inner) end of the boss defining a recess or depression 12 for receiving the head of a fastener. Typically recess 12 is tapered and has a hole 14 in its bottom wall 16. In this case only the boss engages the metal support, with the panel portion 18 of the plastic component being spaced from support 4.

It is recognized that in some installations bottom wall 16 of the recess 12 may be imperforate and instead the fastener may have been forcibly driven through the end wall into the metal support structure 4. Whether or not a hole is preformed in bottom wall 16 before the fastener is installed to secure two components 2A and 4 in place is irrelevant for purposes of this invention.

FIG. 3 shows an alternative configuration. In this case the side of the plastic component 2B facing metal support 4 is flat instead of having one or more bosses as shown at 10 in FIG. 1. However, the opposite side of plastic member 2B is formed with a recess 20 that is similar to recess 12. Recess 20 also is sized to accommodate the screw head 8A. Typically the bottom wall of recess 20 is formed with a hole 22 similar to hole 14 to facilitate insertion of the shank of the fastener. However, as previously noted, it is recognized that in some installations the hole 22 may be omitted and instead the fastener may have been forcibly driven through the end wall of recess 20 into the supporting metal structure 4.

FIG. 4 shows a third configuration. In this case the plastic component 2C has flat surfaces without any depression or recess, and the head of the fastener protrudes from one side of the plastic sheet. This arrangement is less common than those shown in FIGS. 1 and 2, but the invention is useful with this arrangement as well.

The arrangements illustrated in FIGS. 1–3 present the most difficulty with respect to removing the fasteners with a screwdriver-type tool, for the reason that the heads of the fasteners reside in depressed or recessed portions of the plastic component. However, the tool of FIGS. 5 and 6 overcomes the limitations of screwdriver-type tools.

Referring now to FIG. 5, there is shown an impacting driver that comprises a pneumatic cylinder housing 24, a striker-guiding bottom end member 26, and a top end member 28 that comprises a handle portion 30 and a pneumatic control section 32. Bottom end member 26 and top end member 28 are releasably secured to housing 24 by screw means (not shown). The upper end of housing 24 is formed with a valve housing 34 that is located adjacent to top end member 28. Valve housing 34 is characterized by a circular hole 36 designed to slidingly received a reciprocating poppet valve member 40 described in greater detail hereinafter.

Housing 24 encloses a cylinder 42 that is aligned with valve housing 24. Cylinder 42 forms a primary pneumatic chamber in which a piston unit 74 is adapted to reciprocate in response to pressure differentials as described below. An annular chamber 46 is formed between cylinder 42 and the wall of housing 24. This annular chamber 46 serves as part of the primary pressurized air supply path connecting the upper end of cylinder 42 with a pressurized air supply port 48 that is formed in top end member 28. Chamber 46 has a volume that is about two times, but more advantageously four times, the volume of that portion of the interior volume of cylinder 42 that lies between poppet valve 40 and piston unit 74 with the latter and its associated striker 76 are at the limit of their drive stroke. The primary air path includes a conduit 50 formed in the wall of housing 24 which communicates with air supply port 48 as hereinafter described.

The bottom end of housing 24 is formed with a circular hole 54 that is coaxial with circular hole 36. The bottom end of cylinder 42 is anchored in hole 54 and is closed off by a cylindrical plug or end cap 58 that is secured in place by a force fit or by other suitable means. O-ring seals 60A and 60B are provided between cylinder 42 and hole 54 to assure that no air can pass out through hole 54. An annular elastomeric cushion member 64 is anchored in plug 58 in spaced surrounding relation to striker 76.

The bottom end member 26 comprises a body portion 68 that closes off the bottom end of housing 24, and a striker guiding portion in the form of a tubular extension 70. The inside diameter of extension 70 is sized to make a close sliding fit with striker 76. The bottom end of extension 70 terminates in a flat annular end face 72.

Piston unit 74 is a differential piston and is preferably formed by machining a top piston 74A, a bottom piston 74B, and a connecting shaft 76 as a one-piece unit. Pistons 74A and 74B have peripheral grooves in which are mounted resilient ring seals 78A and 78B. The latter may be elastomeric O-rings. The diameter of top piston 74A is greater than the diameter of bottom piston 74B. Additionally, the inner surface of cylinder 42 is stepped, having a larger inner diameter upper section 80A sized to mate with top piston 74A and a smaller inner diameter lower section 80B sized to mate with bottom piston 74B. Also cylinder 42 has a plurality of openings 45 near the bottom of its larger inner diameter upper section that act as ports to allow air to flow into and out of the space between the top and bottom pistons.

Cushion member 64 is sized to be engaged by the bottom end surface of bottom piston 74B as the striker is driven to its extended position, so as to prevent piston unit surface 75A from engaging the shoulder formed by the junction of the larger inner diameter section 80A and the smaller inner diameter section 80B since such engagement would damage the piston unit.

The bottom end of piston unit 74 is formed with a threaded hole (not visible in FIG. 1) and screwed into that hole and locked to the piston unit is a striker or hammer 76 that is coaxial with pistons 74A and 74B. Striker 76 is made of a hardened tool steel capable of withstanding the shock of repeatedly impacting it against a work piece. It is noted that end cap 58 has a center hole 59 that is oversized with respect to striker 76, so as to provide a passageway for allowing air to pass between the interior volume of cylinder 42 below piston unit 74B and the interior of body portion 68 of bottom member 26. The latter has an opening 83 for venting its interior space to the atmosphere. Preferably the tip or bottom end of striker 76 is rounded as shown in a convex configuration, but it may be flat or slightly concave if desired. Also, the end of the striker may be tapered to a smaller diameter near its tip, if so desired.

Poppet valve member 40 comprises an annular top section 84A with a flat top surface and a cylindrical outer surface, and a bottom section 84B that also has a cylindrical outer surface, with the outer diameter of top section 84A being greater than that of bottom section 84B. The outer surfaces of sections 84A and 84B have peripheral grooves to accommodate O-ring seals 86A and 86B respectively. The bottom section 84B is slidably disposed in hole 36 of valve housing 34, with bottom section 84B being sized to make a close sliding fit with hole 36 and seal member 86B acting to prevent loss of air between it and the surrounding surface of valve housing 34. The center of poppet valve member 40 has an axial tubular extension 88 that defines an axially-extending passageway 90 that is open at its bottom end so as to communicates with the upper end of cylinder 42. Extension 88 has a peripheral groove to accommodate an O-ring seal 92 that engages an interior surface portion of top end member 28 as described hereinafter. The bottom section 84B of valve member 40 is provided with a resilient annular sealing member 94 that has a flat end surface and is arranged so as to engage the upper end of cylinder 42 when the poppet valve is in its down (closed) position as hereinafter described. It should be noted that the outside diameter of sealing member 94 is greater than that of cylinder 42, so that an annular edge portion of sealing member 94 overlaps the top edge of the cylinder.

The bottom end of top end member 28 is formed with an end cavity 96 that serves as a valve chamber for the upper section 84A of poppet valve member 40. Consequently the cylindrical surface 97 defining cavity 96 has a diameter sized so that the upper section 84A of the poppet valve will make a close sliding fit. Seal 86A assures that air will not leak out between surface 97 and the poppet valve. Top member 28 also has one or more side ports 100 located at the lower end of cavity 96, for the purpose of venting the annular space formed between the two exterior cylindrical surfaces of poppet valve sections 84A and 84B, thereby preventing any hang-up of the poppet valve.

An interior section 102 of top end member 28 has a cylindrical hole 104 located coaxially with cavity 96 to accommodate tubular extension 88 of the poppet valve. Extension 88 make a close sliding fit in hole 104, with O-ring seal 92 assuring that air will not leak out between the exterior surface of extension 88 and interior section 102. Section 102 has one or more small vent ports 106 at the upper end of hole 104. Vent ports 106 lead through the side wall of top member 28 to the outside atmosphere. A resilient cushion 108 in the top end of hole 104 limits upward movement of the poppet valve.

The pneumatic control section of top end member 28 comprises a manually operable 3-way pneumatic control valve 110, and interior passageways 112 and 114. One end of passageway 112 communicates with conduit 50. Passageway 112 also communicates with air inlet port 48. The latter is fitted with a conventional hose fitting 116 for use in connecting the tool to a source of pressurized air. The other end of passageway 112 communicates with valve 110. One end of passageway 114 communicates with cavity 96, while its other end communicates with control valve 110.

Control valve 110 is mounted in a hole 116 in top end member 28. Valve 110 is substantially identical to the control valve disclosed in my U.S. Pat. No. 4,128,110 issued Dec. 5, 1978 for Control Valve and also the control valve 76 shown in my U.S. Pat. No. 4,122,904, issued Oct. 31, 1978 for Pneumatic Driver.

Figure 6:
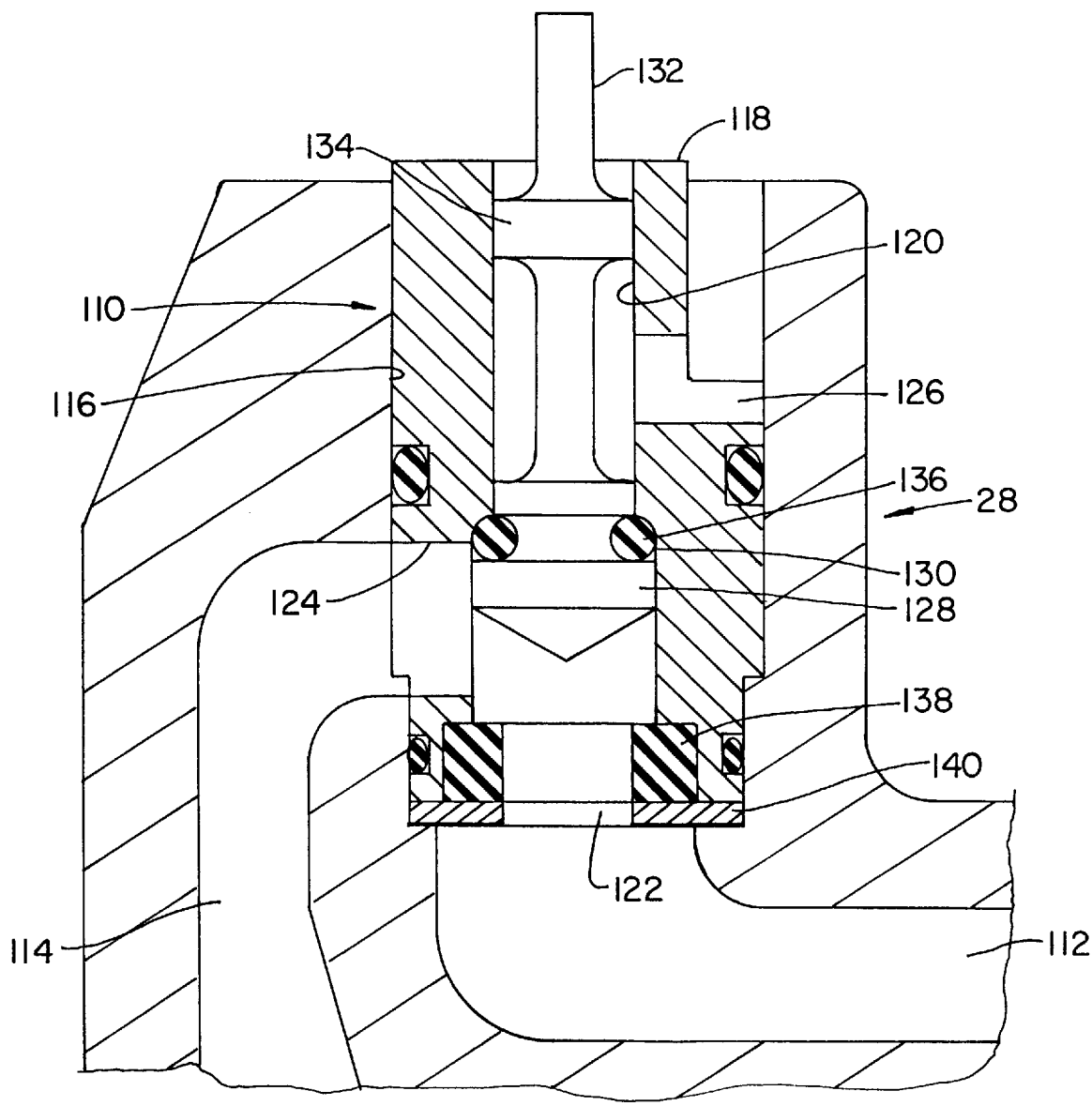
FIG. 6 is an enlarged sectional view illustrating details of the control valve unit of the tool of FIG. 4.

As seen in FIG. 6, control valve 110 comprises a housing 118 that is mounted in cylindrical hole 116 in top end member 28. Housing 118 has an axial bore 120, an end port 122 communicating with passageway 112, a first side port 124 communicating with passageway 114 and a second side port 126 that leads to the atmosphere outside the tool. Slidably mounted within axial bore 120 is a valve member comprising a valve head 128 that is tapered at one end and carries a peripherally-extending O-ring 130 at its other end, plus a valve stem 132 having an enlarged flange 134 that acts as a guide to keep the stem centered in bore 120. The bore 120 is stepped, having a shoulder 136 that acts as a first valve seat for O-ring 130. A second valve seat is provided by a resilient ring 138 that is captivated in the end port 122 of housing 118 by a washer 140. Valve head 128 is movable between a first position in which O-ring 130 is seated on shoulder 136 (the first valve seat) and a second position in which the conical end of valve head 128 engages ring 138

(the second valve seat). The outer end of stem 132 projects from housing 118 in position to be engaged by one end of a trigger member 142 that is pivotally attached to the handle portion 30 of top member 28. Handle portion 30 and trigger member 142 may take various forms without adversely affecting or limiting the invention.

When the valve head 128 is in sealing contact with its shoulder 136, there is an open air path from the main air supply inlet port 48 through passageway 112 and valve 110 to passageway 114. When valve head 128 is moved off of its seat 136 down against its seat 138, passageway 112 is blocked off from passageway 114 and instead the latter passageway is connected directly to the outside atmosphere via side port 124, hole 116 and side port 126 of valve 110, thereby venting cavity 96 to the atmosphere.

It will be noted that when port 48 is connected to a source of pressurized air, e.g., air at a pressure of 125 psi, the positive air pressure is transmitted via passageway 112 and valve end port 122 to the interior of control valve housing 118, urging valve head 128 against valve seat 136 and thereby allowing the pressurized air to flow via side port 124 into passageway 114, with the result that poppet valve 40 is forced down into sealing engagement with the top end of cylinder 42. At the same time, the high pressure air passes out of conduit 50 via its end opening 57 into chamber 46 surrounding cylinder 42. The high pressure air in chamber 46 also enters cylinder 42 via ports 45 into the space between the two pistons.

The piston unit is made so that the confronting end faces 75A and 75B of top and bottom pistons 74A and 74B respectively have the same internal diameter at their junction with shaft 76, but different outside diameters, with the result that their effective areas are different. In essence the effective force on the larger end face 75A is greater than the effective force on the smaller end face 75B.

The resultant force differential tends to keep the differential piston unit permanently biased upwardly the normal position illustrated in FIG. 5. In this connection it should be noted that there is no pressure on the upper face of piston member 74A because that face is directly in contact with the atmosphere through vent passageway 90 and ports 100.

Operation of the device per se is as follows. Assume that the device is connected to a source of pressurized air and that no force is being exerted on the trigger. In that event, the valve member of control valve 110 will be seated against seat 136, poppet valve will be in its closed position and the piston unit will be in its raised position, with the striker retracted into tubular extension 70, all as shown in FIG. 5. If now the operator squeezes trigger 142 (so as to pivot it counterclockwise as viewed in FIG. 5), the following action will occur immediately:

1. Control valve head 128 moves into engagement with seat 138, thereby unblocking port 126 so that air rushes out of cavity 76 back to atmosphere through passageway 114 and control valve ports 124 and 126.

2. Outflow of air from cavity 76 removes the pneumatic force holding poppet valve 20 in its downward, or venting, position. Consequently poppet valve 20 rises due to the pneumatic pressure exerted on its underside where it protrudes beyond the margin of cylinder 42. The poppet valve rises up against cushion 108, blocking vent port 106.

3. Simultaneously the upper end of cylinder 42 is exposed to the air pressure in chamber 46, with the result that high pressure air pours onto the top face of top piston 74A, reversing the pressure differential on the piston unit.

4. Piston unit 74 immediately starts downwardly. Air pushed downwardly before lower piston 54B vents to atmosphere through hole 59 and opening 83 in bottom member 26.

5. The piston unit accelerates the striker 76, driving the striker downwardly to an extended limit position determined by the length of the piston's drive stroke. In its extended limit position, the striker projects from the forward end of extension 72 by about one inch (1"). When the piston undergoes its return stroke, the striker is retracted far enough for its tip to be fully withdrawn into extension 70, preferably so that its tip is short of the end face 72 of the extension 70 by about one inch (1").

6. The striker will remain in its extended limit position so long as the trigger is depressed. However, once the trigger is released, the air pressure in passageway 112 will force valve head 128 to move back away from valve seat 138 into engagement with valve seat 136. When this occurs, the flow of air through passageway 112 is reversed, and high pressure air again flows through passageway 114 against the upper side of the poppet valve, forcing the poppet valve downward against the upper end edge of cylinder 42. At this point the port 106 in the internal portion 104 of top end member is again unblocked, whereupon air in the portion of cylinder 22 above the upper face of top piston 74A is then vented to the atmosphere via poppet valve passageway 90 and port 106.

Simultaneously high pressure air in chamber 46 enters cylinder 42 between pistons 54A and 54B via holes 45, whereupon a pressure differential (occurring because of the aforementioned area differential between the upper and lower pistons) is again established which causes the piston unit with its attached striker member to move upwardly in cylinder 42. At this point the striker is again in the retracted position shown in FIG. 5.

The foregoing device, being characterized by a relatively obstruction-free air supply and venting system, provides an acceleration capability that assures a high velocity impacting action by the striker. In this connection, the use of a quick-acting, wide-mouthed poppet valve assures that a high rate of acceleration of the striker occurs immediately upon depressing the trigger. The high velocity impacting action of the device is a consequence of (1) providing a suitable acceleration time (i.e., optimum rate of acceleration) for the striker before it impacts a work object, e.g., a fastener as hereinafter described; and (2) making certain that the accelerating time is well utilized. These are assured by providing a suitable distance between the point at which the striker is first set in motion and the point that it hits the fastener that is to be impacted, and also the provision of a suitable gas supply to the piston unit. Unless an excellent supply of motive gas is maintained, the piston, after initial acceleration, can be starved and fail to meet its optimum potential velocity. A particular feature of the invention is the rapid opening poppet valve allowing a fast and large supply of compressed air into the piston chamber. Additionally the poppet valve allows a relatively large opening for air flow into the top end of cylinder 42. That relatively large opening, and the absence of any serious flow obstructions, assures an ample supply of motive air in relation to the area of the operating surface of the piston and the displacement volume resulting from downward movement of the piston unit as it executes its work stroke.

The best practice is to have a ratio of the area of the operating surface of the piston unit to the area of the poppet valve opening in the range of between 8 to 1 and 4 to 1, preferably below 4 to 1 when operating with an air supply pressure below 130 psi. It is has been determined that with an air supply pressure of about 125–130 psi the poppet valve will open wide within about 1.7 milliseconds and typically the piston unit will have a striker-actuating stroke of about 7 milliseconds for a three-inch stroke. Thus the poppet valve fully opens within the first 25% of the total time required to drive the piston through its striker-actuating stroke, creating an optimum acceleration and yielding a strong striking force on a work object.

Referring now to FIGS. 7 and 8, application of the method of the present invention will now be described in relation to the plastic component/fastener/metal component arrangement illustrated in FIG. 1. The striker guide or nozzle 70 is inserted into the recess 12 of plastic component 2A so that the end of the striker guide surrounds the fastener head 8A. Then trigger 142 is squeezed so as to force control valve head 128 off of its valve seat 136, whereupon high pressure air is vented from the poppet valve via passageway 114 and the control valve, causing the poppet valve to open. Immediately high pressure air from chamber 46 acts on the upper end face of piston 74A, creating a differential pressure that almost instantaneously causes piston unit 74 to move down in cylinder 42, causing striker 76 to impact the fastener head with sufficient force to rupture the plastic component 2A around the head of the fastener. Because the thickness and tear strength of the plastic material surrounding the fastener will vary from part to part, the rupture line will also vary, both in location and contour. However, in general and as shown in FIG. 8, the rupture caused by the impact of striker 76 will push the fastener out of the metal component 4, at times leaving plastic trapped under the head of the fastener as shown in FIG. 8. The metal component 4 also may be distorted, as shown in FIG. 8, to allow the head of the fastener to pass through it under the impact of striker 76. The degree or amount of distortion of metal component 4 is a function of its thickness.

Similar results occur when the method of this invention is applied to configurations like those shown in FIGS. 3 and 4.

In assessing this invention, it should be noted that in the case of automotive vehicles and also some appliances, the underlying and supporting metal component 4 typically has a thickness in the range of $\frac{1}{32}$–$\frac{1}{16}$ inch and hence it tends to flex when the head of the fastener 6 is impacted. In such circumstances it is believed that when the head of fastener 6 is impacted by striker 76, the metal component undergoes some flexing away from the plastic component and that such flexing facilitates rupturing of the plastic component in the manner illustrated in FIG. 8. An important advantage of this invention is that piston unit 74 and striker 76 are formed as a one-piece unit, being machined from a single block of metal.

It is to be understood that the foregoing description and drawings are not intended to be exhaustive but merely illustrative of the invention in order that others skilled in the art will more fully understand and utilize the principles and features of the invention. Consequently It is recognized that various changes and modifications can be made without departing from the teachings presented by the foregoing description and the accompanying drawings. Thus, for example, the metal support 4 may be replaced by a support of some other material.

It is also to be understood that the following claims are intended to cover all of the generic and specific features of the invention herein described or rendered obvious.

I claim:

1. A method for detaching a plastic component from a supporting structure where the plastic component is attached to said structure by a fastener having a head and a shank, with said head engaged with a surface of the plastic component and the shank extending through the plastic component into said structure, said method comprising propelling a striker into engagement with said fastener head with sufficient force to rupture said plastic component around said fastener head and shank.

2. A method according to claim 1 wherein said plastic component is formed with a recess and said fastener head resides in said recess.

3. A method according to claim 2 wherein said striker is part of a tool having a nozzle portion in which said striker is mounted for reciprocal movement, and further wherein said nozzle is disposed in said recess when said striker is propelled into engagement with said fastener head.

4. A method according to claim 3 wherein said striker is propelled pneumatically.

5. A method according to claim 3 wherein said tool is a pneumatic driver having a pneumatically operated piston for driving said striker through a drive stroke, and means for providing a continuous supply of motivating air to said piston and valving said air supply so as to increase the acceleration of the striker throughout the major portion of said drive stroke.

6. A method according to claim 5 wherein during said drive stroke said striker travels for a distance at least as long as the overall length of said fastener.

* * * * *